United States Patent [19]

Hirasawa

[11] Patent Number: 5,689,484

[45] Date of Patent: Nov. 18, 1997

[54] AUTO-CHANGER AND METHOD WITH AN OPTICAL SCANNER WHICH DISTINGUISHES TITLE INFORMATION FROM OTHER INFORMATION

[75] Inventor: Kazuo Hirasawa, Nagaokakyo, Japan

[73] Assignee: Mitsubishi Denki Kabushiki Kaisha, Tokyo, Japan

[21] Appl. No.: 267,226

[22] Filed: Jul. 5, 1994

Related U.S. Application Data

[63] Continuation of Ser. No. 870,213, Apr. 17, 1992, abandoned, which is a continuation of Ser. No. 595,564, Oct. 11, 1990, abandoned.

[30] Foreign Application Priority Data

| Oct. 14, 1989 | [JP] | Japan | 1-267142 |
| Oct. 17, 1989 | [JP] | Japan | 1-270984 |
| Oct. 30, 1989 | [JP] | Japan | 1-283879 |
| Oct. 30, 1989 | [JP] | Japan | 1-283880 |

[51] Int. Cl.$^6$ .................... G11B 17/22; G11B 31/00
[52] U.S. Cl. .................... 369/33; 382/306
[58] Field of Search .................... 369/32, 33, 34, 369/36.38, 30, 272, 273; 360/92–95, 97.03, 97.04, 98.01, 98.04; 382/8, 46, 65, 282, 305, 306, 321

[56] References Cited

U.S. PATENT DOCUMENTS

| 3,778,768 | 12/1973 | Brisk et al. | 340/146.3 |
| 3,930,141 | 12/1975 | Koyama et al. | 382/8 |
| 3,975,710 | 8/1976 | Watanabe et al. | 340/146.3 C |
| 4,341,952 | 7/1982 | John et al. | 369/273 |
| 4,449,198 | 5/1984 | Kroon et al. | 369/33 X |
| 4,527,262 | 7/1985 | Manto | 369/38 X |
| 4,641,203 | 2/1987 | Miller | 369/15 X |
| 4,766,581 | 8/1988 | Korn et al. | 369/34 X |
| 4,812,629 | 3/1989 | O'Neil et al. | 360/92 X |
| 4,889,982 | 12/1989 | Young et al. | 235/494 |
| 4,899,326 | 2/1990 | Takeya et al. | 369/33 X |
| 4,903,255 | 2/1990 | Sugaya et al. | 369/272 |

FOREIGN PATENT DOCUMENTS

| 0239393 | 10/1987 | Japan | 369/33 |
| 0223992 | 1/1990 | Japan . | |

OTHER PUBLICATIONS

"Car Audio Current Status and Car CD Development," A. Shimizu, *Jodosha Gijutsu*, vol. 41, No. 2, 1987.

*Primary Examiner*—John H. Wolff
*Assistant Examiner*—David D. Davis

[57] ABSTRACT

An auto-changer stores media such as audio or video discs or tape cassettes in numbered slots in a magazine. For each of the media in the magazine, title information is entered from an input device and stored in a memory. The input device may be a manual device, such as a keyboard, or an automatic device, such as optical character recognition equipment. The titles are sorted in the memory and displayed on a display in, for example, alphabetic order, so that the user can find desired titles easily. When the user selects a title from the display, a changer transfers the corresponding medium from the magazine to a player.

46 Claims, 8 Drawing Sheets

FIG. 2

| DISPLAY POSITION | TITLE | SLOT NO. |
|---|---|---|
| 1 | BACH: GOLDBERG VARIATIONS | 2 |
| 2 | MOZART: REQUIEM | 3 |
| 3 | SCHUBERT: DEATH AND THE MAIDEN | 1 |

↓ ADD NEW DISC

| DISPLAY POSITION | TITLE | SLOT NO. |
|---|---|---|
| 1 | BACH: GOLDBERG VARIATIONS | 2 |
| 2 | MOZART: REQUIEM | 3 |
| 3 | SCHUBERT: DEATH AND THE MAIDEN | 1 |
| 4 | BACH: WELL-TEMPERED CALVIER | 4 |

↓ SORT LIST

| DISPLAY POSITION | TITLE | SLOT NO. |
|---|---|---|
| 1 | BACH: GOLDBERG VALIATIONS | 2 |
| 2 | BACH: WELL-TEMPERED CALVIER | 4 |
| 3 | MOZART: REQUIEM | 3 |
| 4 | SCHUBERT: DEATH AND THE MAIDEN | 1 |

FIG. 3

| DISPLAY POSITION | TITLE | SLOT NO. |
|---|---|---|
| 1 | ROLLING STONES: GREATEST HITS | 42 |
| 2 | CHOPIN: PRELUDES | 41 |
| 3 | LOUIS ARMSTRONG & HOT FIVE | 23 |
| 4 | VIVALDI: FOUR SEASONS | 40 |
| 5 | SOUSA: MARCHES | 39 |
| 6 | ORFF: CARMINA BURANA | 38 |
| 7 | BEATLES: SERGEANT PEPPER | 37 |
| 8 | SCHONBERG: VERKLARTE NACHT | 36 |
| 9 | FRANCK: SYMPHONY IN D MINOR | 7 |
| 10 | RESPHIGI: PINES OF ROME | 35 |
| 11 | BARTOK: PIANO CONCERTO #2 | 26 |
| 12 | BEETHOVEN: HAMMERKLAVIER | 33 |
| 13 | BEETHOVEN: KREUTZER SONATA | 1 |
| 14 | BEETHOVEN: STRING QUARTET #14 | 14 |
| 15 | BORODIN: PRINCE IGOR | 30 |
| 16 | BRAHMS: SYMPHONY #4 | 8 |
| 17 | BRITTEN: CEREMONY OF CAROLS | 24 |
| 18 | BRUBECK: TAKE FIVE | 17 |
| 19 | CHOPIN: NOCTURNES | 25 |
| 20 | CHOPIN: WALTZES | 19 |
| 21 | DEBUSSY: CHILDREN'S CORNER SUITE | 4 |

FIRST PART: positions 1–10
SECOND PART: positions 11–21

AUTO-CHANGER AND METHOD WITH AN OPTICAL SCANNER WHICH DISTINGUISHES TITLE INFORMATION FROM OTHER INFORMATION

This application is a continuation, of application Ser. No. 07/870,213 filed on Apr. 17, 1992; which is a Continuation of application Ser. No. 07/595,564 filed Oct. 11, 1990; both of which are now abandoned.

BACKGROUND OF THE INVENTION

This invention relates to an auto-changer for storing pre-recorded media such as audio or video discs or cassettes and selecting and playing one of the stored media. More particularly, it relates to an auto-changer with an improved user interface.

The prototype of all auto-changers was the juke box, a device frequently used to provide music on demand in public facilities. The traditional juke box stored, for example, fifty 45-rpm records and had a front panel equipped with one hundred buttons, allowing the user to select either side of any of the stored records. The title of the recorded music was commonly written on a title slip displayed beside the corresponding button. When the proprietor of the facility changed the records stored in the juke box, he would also change the title slips.

With advances in technology, auto-changers are now being manufactured for use in private homes, or even in automobiles. Instead of 45-rpm records, these auto-changers store newer media such as compact discs, video discs, video tape cassettes, or digital audio tape cassettes. One commercially available auto-changer, for example, is installed in the trunk of an automobile and has a magazine with ten slots for storing compact discs. A device mounted on the dashboard has ten numbered buttons, enabling the user to select and play any of the stored discs.

In order to select discs by the numbered buttons of this auto-changer, however, the user must keep a list indicating which disc is stored in which slot. Having to make such a list and update it each time a new disc is put in the magazine is an inconvenience that detracts considerably from the advantage of fingertip selection of discs. In particular, if the user misplaces the list, he may have to resort to pushing buttons at random.

Auto-changers developed for home use may have many more than ten slots, in which case list maintenance becomes all the more troublesome. Some automatic compact disc changers are equipped with a memory and display that somewhat alleviate this problem. When the user puts a new disc in the magazine he enters its title and slot number, using a keyboard, and this information is stored in the memory. When the user wants to select a disc, he can call up a list of stored discs from the memory onto the display.

A problem with these auto-changers is that the list is kept and displayed in order of slot number. This can make it quite difficult to find a desired disc title on the list, especially when the list is too long to be displayed all at once and the user has to scroll or page through several screens.

SUMMARY OF THE INVENTION

It is accordingly an object of the present invention to enable the user to find a desired title easily.

Another object of the present invention is to create a list of titles automatically.

An auto-changer comprises a magazine having a plurality of slots for storing media, a player for reproducing signals recorded on the media, a changer for selecting a slot in the magazine and transferring a medium between the player and the selected slot, input means for entering titles of media stored in the magazine, and a memory for storing a list of slot numbers and titles of media stored in the corresponding slots. The input means may comprise a keyboard for manual entry of the titles, or it may comprise optical character recognition equipment that automatically scans and recognizes title information on the media.

A sorting means sorts the list stored in the memory according to the titles. A display displays the titles, and a control means enables the user to select one of the titles from the display. A system controller receives the titles from the input means, writes the titles and corresponding slot numbers in the memory, commands the sorting means to sort the list stored in the memory, and commands the changer to select the slot in the magazine corresponding to the title selected by the control means.

BRIEF DESCRIPTION OF THE DRAWINGS

FIG. 2 illustrates the sorting of a list of titles and slot numbers stored in the memory in FIG. 1.

FIG. 3 illustrates an alternative method of sorting the list.

DETAILED DESCRIPTION OF THE INVENTION

Embodiments of the present invention will be described with reference to the drawings. These embodiments and drawings are presented for purposes of illustration and do not restrict the scope of the invention, which should be determined solely from the appended claims.

Figure 1:
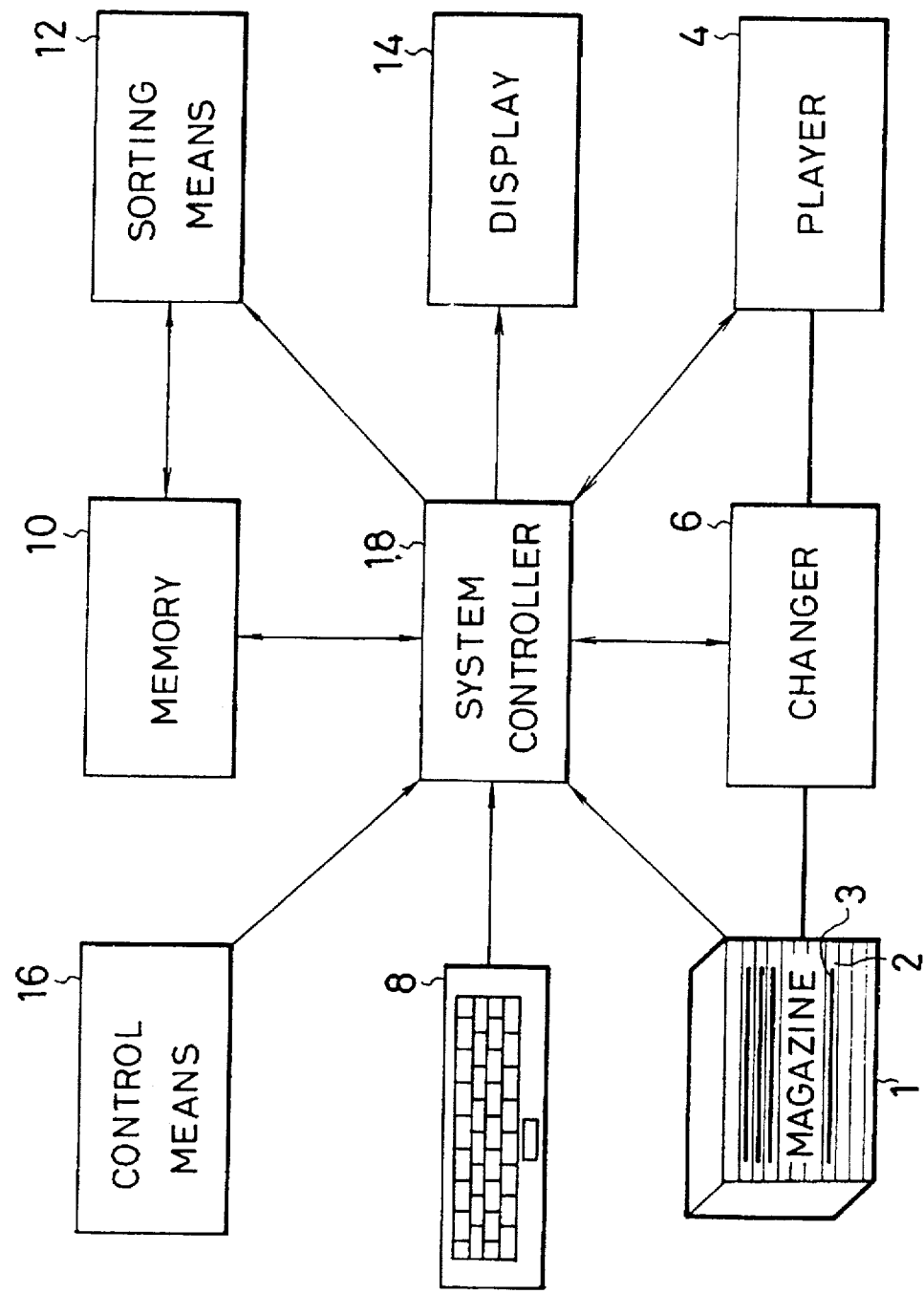
FIG. 1 is a block diagram of the invented auto-changer.

FIG. 1 is a block diagram illustrating a basic embodiment of the invented auto-changer. Narrow lines with arrowheads indicate electrical interconnections, the arrows showing the direction of signal flow. Thick lines indicate mechanical interconnections.

The auto-changer in FIG. 1 comprises a magazine 1 having a plurality of slots 2 adapted for storing a certain type of media, such as audio or video discs 3. The slots 2 are identified by slot numbers not specifically indicated in the drawing. The discs 3 are pre-recorded with audio or video signals that can be reproduced by a player 4. A changer 6, which is mechanically coupled to the magazine 1 and the player 4, selects a slot 2 in the magazine according to its slot number and transfers a disc 3 between the player 4 and the selected slot 2. The mechanical structure of the magazine 1, the player 4, and the changer 6 will not be described in detail as these elements are all well known from the prior art.

The auto-changer also has an input means for entering titles of discs stored in the magazine 1. The input means in this embodiment is a keyboard 8 similar to the keyboard of a personal computer or electronic organizer, having keys for entering letters of the alphabet.

Titles entered from the keyboard 8 are stored in a memory 10. More specifically, the memory 10 stores a list of the titles of the discs 3 and the slot numbers of the slots 2 in which the discs 3 are stored in the magazine 1. The memory 10 may be a battery-backed-up semiconductor random access memory (RAM), or any other type of memory, the contents of which can be written and read and are not lost when the power of the auto-changer is switched off.

A sorting means 12 sorts the list of slot numbers and titles stored in the memory 10 according to the titles. Specifically, the sorting means 12 sorts the list in alphabetical order of title. The sorting means 12 may be, for example, a general-purpose microcomputer chip programmed to execute an alphabetic sorting algorithm (such sorting algorithms are well known), or an application-specific integrated circuit implementing an alphabetic sorting algorithm in hardware.

Titles stored in the memory 10 can be exhibited on a display 14 comprising, for example, a liquid crystal display (LCD) or a cathode ray tube (CRT). The user uses a control means 16 to select one of the titles from the display 14. The control means 16 may comprise, for example, a push-button panel with a pair of buttons for moving a pointer on the display 14 up and down the list and another button for selecting the title at the location of the pointer. Alternatively, the control means 16 may comprise a pointing device such as a joy-stick, track ball, or mouse.

Overall operation of the auto-changer is controlled by a system controller 18 comprising one or more well-known microelectronic devices such as a microprocessor, display controller, and read-only memory (ROM). The system controller 18 is electrically coupled to the magazine 1, the player 4, the changer 6, the keyboard 8, the memory 10, the sorting means 12, the display 14, and the control means 16. Specific functions of the system controller 18, which will be described below, are executed by hardware and software the design of which will be obvious to one skilled in the art.

Next the operation of this auto-changer will be explained. Two operations will be described: the operation of installing a new disc in the magazine 1 and entering its title, and the operation of selecting and playing a disc.

To install a new disc 3 and enter its title, the user begins by placing the disc 3 in an unoccupied slot 2 in the magazine 1. The magazine 1 is preferably adapted to sense the occupied slots and notify the system controller 18 of their slot numbers. By comparing these slot numbers with the list of slot numbers stored in the memory 10, the system controller 18 determines which slot contains the new disc 3 and displays its slot number on the display 14 for the user's confirmation. If the magazine 1 is not capable of sensing occupied slot numbers, the system controller 18 displays a prompt on the display 14 asking the user to enter the slot number from the keyboard 8.

Next the user is prompted to enter the title of the disc from the keyboard 8. The system controller 18 receives the entered title character string, displays it on the display 14, and writes it in the memory 10 together with the slot number of the new disc 3, appending this information to the list of titles and slot numbers stored in the memory 10. Then the system controller 18 commands the sorting means 12 to sort the list. The sorting means 12 sorts the list by reading it from the memory 10 and rewriting it so that the titles are arranged in alphabetic order.

FIG. 2 shows the manner in which the titles and slot numbers are stored in the memory 10 and the manner in which they are sorted. The DISPLAY POSITION column indicates the order in which the titles are stored, which is also the order in which they will be displayed on the display 14. In FIG. 2 the magazine 1 originally contains three discs, stored in slots one to three. When the user installs a new disk (Bach: Well-Tempered Clavier) in slot four, the system controller 18 adds its title and slot number to the end of the list, then the sorting means 12 rearranges the titles in alphabetic order. When the titles are rearranged by sorting, the slot numbers are also rearranged so that each slot number stays with its corresponding title.

Next the operation of selecting and playing a disc will be described.

The user begins by pressing a button on the control means 16 indicating that he wants to select a disc. The system controller 18 responds by retrieving the list of titles from the memory 10 and displaying it on the display 14. The slot numbers can also be displayed, although this is not necessary. If the list is too long for all titles to be displayed, the display 14 displays the first part of the list.

Using the control means 16, the user now selects one of the titles from the list. If the desired title is not displayed, the user can page or scroll through the list until he finds the title he wants. The control means 16 may be equipped with page-up and page-down buttons for this purpose, or other well-known paging or scrolling techniques can be used. Even if the list comprises several pages, the user can quickly and easily find the desired title because the titles are listed in alphabetic order.

When the user selects a title, the system controller 18 retrieves the corresponding slot number from the memory 10, sends this slot number to the changer 6, and issues a fetch command to the changer 6. The changer 6 responds by fetching the disc 3 stored in the slot 2 having the specified slot number and transferring the disc 3 to the player 4. The system controller 18 then commands the player 4 to play the disc 3. When the disc 3 is finished, the player 4 notifies the system controller 18, the system controller 18 sends a return command to the changer 6, and the changer 6 returns the disc 3 to the same slot 2.

The sorting algorithm used by the sorting means 12 is not restricted to simple alphabetic ordering of the titles; other algorithms may be used instead. One of these is illustrated in FIG. 3.

In FIG. 3, the sorting means 12 divides the list into two parts: a first part comprising display positions one to ten, containing the ten most recently entered titles, and a second part comprising display positions eleven and onward, containing the remaining titles of discs stored in the magazine 1. The first part of the list is sorted in the order in which the titles are entered: the most recently entered title first, the next most recently entered title second, and so on. The second part of the list is sorted in alphabetic order. Only the beginning of the second part of the list is shown in FIG. 3.

When a new title is entered, the sorting means 12 places it at the top of the first part of the list and moves the last title in the first part of the list to its alphabetic position in the second part of the list. Thus there are always ten titles in the first part of the list.

When the user selects a title, the first screen he sees on the display 14 comprises the first part of the list, with the pointer indicating the top title. Since this is the title of the disc the user has most recently added to the magazine, it is the one he is most likely to want to play, and he can select it conveniently without having to move the pointer or scroll the display. Other recently-entered titles displayed on this screen can also be selected easily. If the user wants to select an older title, he can scroll into the second part of the list.

The number of titles in the first part of the list is fixed, but need not be ten; any positive integer N can be used. A convenient number is the number of titles that can be displayed at once on the display 14, or a multiple of this number if the display 14 has only a few lines and can display only a few titles simultaneously.

Figure 8:
FIG. 8 shows a compact disc logo mark.

The sorting algorithm shown in FIG. 8 has a number of obvious variations. For example, both parts of the list can be sorted in alphabetic order. Also, in FIG. 3 titles in the first part of the list are not included in the second part of the list, but the sorting algorithm can easily be modified so that the second part of the list contains all the titles. In this case the most recent N titles are displayed in both parts of the list.

By keeping and sorting the list of titles, the auto-changer described above greatly simplifies the selection of titles. Next another auto-changer will be described that simplifies the creation of the title list as well.

Figure 4:
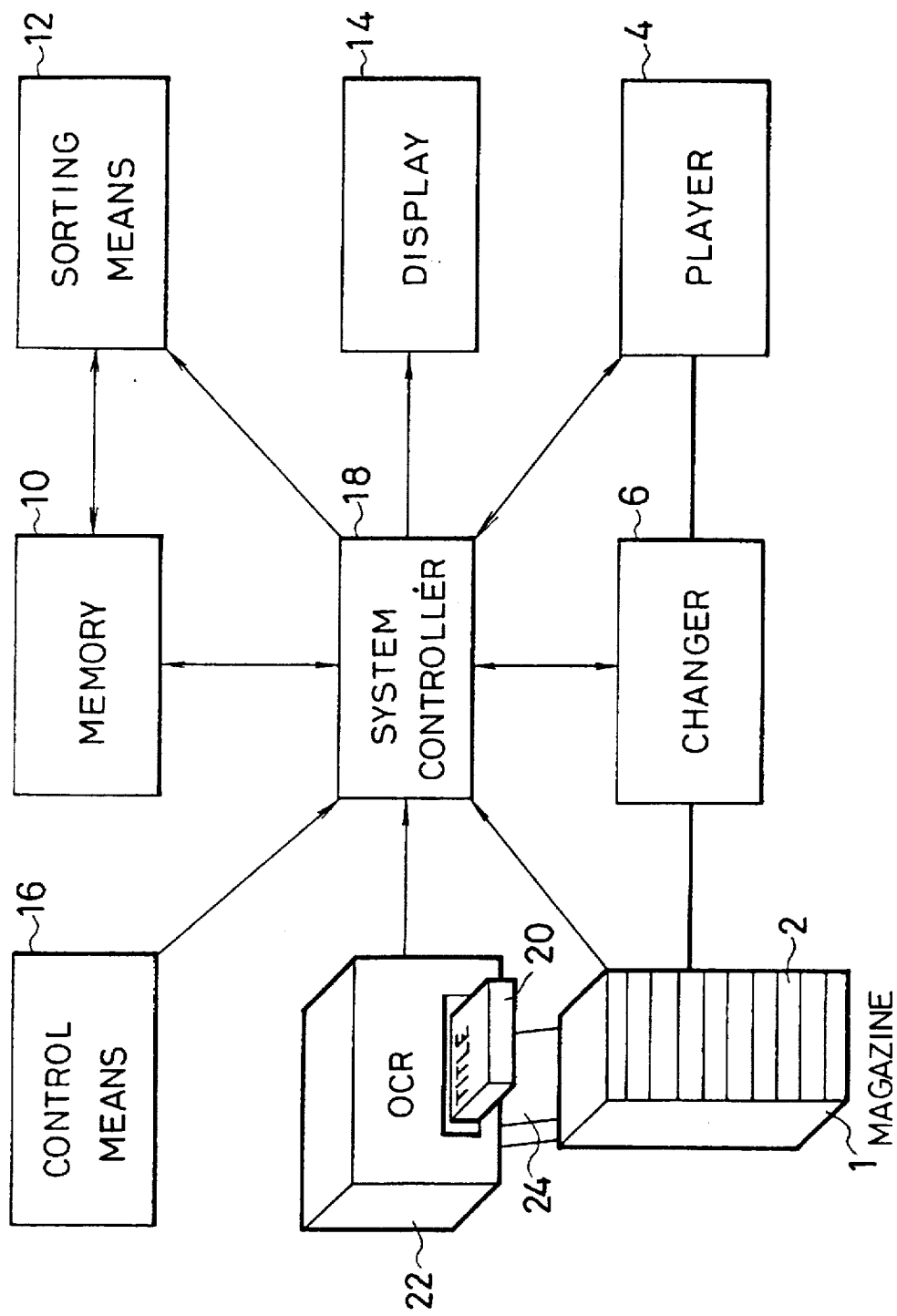
FIG. 4 illustrates an auto-changer for tape cassettes that uses optical character recognition to read title information from the cassettes.

This auto-changer is shown in FIG. 4, elements identical to elements in FIG. 1 being identified with the same reference numerals. The media in this embodiment are tape cassettes 20, such as audio or video tape cassettes. The magazine 1 has slots 2 adapted for storage of these cassettes 20.

The input means in FIG. 4 comprises optical character recognition (OCR) equipment 22 for optically scanning and recognizing title information printed on a tape cassette 20. Optical character recognition equipment is well known from the prior art, so a detailed description of the OCR equipment 22 will be omitted. Suffice it to say that the OCR equipment 22 converts title information, which is printed on the tape cassette 20 in a fixed position, to a bit-mapped image that is analyzed by template-matching algorithms to recognize characters. The template-matching algorithms are executed by computing equipment comprising, for example, a microprocessor and semiconductor memory built into the OCR equipment 22.

A transport means 24 transports the cassette 20 from the OCR equipment 22 to the magazine 1. The transport means 24 is a device similar to the changer 6 for transporting a tape cassette 20 from the OCR equipment 22 to a selected slot in the magazine 1. Although the transport means 24 and the changer 6 are shown as separate in FIG. 4, the auto-changer can of course be designed so that the changer 6 and the transport means 24 are combined into a single device.

The operation of installing a new cassette in the auto-changer in FIG. 4 and adding its title to the list stored in the memory 10 will be described below. The operations of selecting and playing a tape cassette 20 will not be described, since they are substantially identical to the operations of selecting and playing a disc described in FIGS. 1 to 3.

To install a new tape cassette 20 in the auto-changer in FIG. 4, the user inserts the tape cassette 20 in the OCR equipment 22. The OCR equipment 22 scans the title printed on the tape cassette 20 and converts it to a character string which it sends to the system controller 18. The system controller 18 displays the received title character string on the display 14 for the user's confirmation. The user may either confirm the title or correct it, using a keypad attached to the control means 16. If the OCR equipment 22 recognizes characters with sufficient reliability, means of correcting the title are not necessary.

When the title has been confirmed, the transport means 24 transports the tape cassette 20 to the magazine 1 and stores it in a vacant slot 2. The vacant slot 2 is selected by the system controller 18, which controls the transport means 24 via signal lines not shown in the drawing. When the tape cassette 20 has been installed in a slot 2, the system controller 18 appends the title character string and slot number to the list in the memory 10 and commands the sorting means 12 to sort the list. Subsequent operations are as already described in FIGS. 2 and 3.

The auto-changer in FIG. 4 is extremely easy to use because the user does not have to spend time either making or managing the title list. All he has to do is load tape cassettes 20 one after another into the OCR equipment 22; then he can select them from the display 14.

Figure 5:
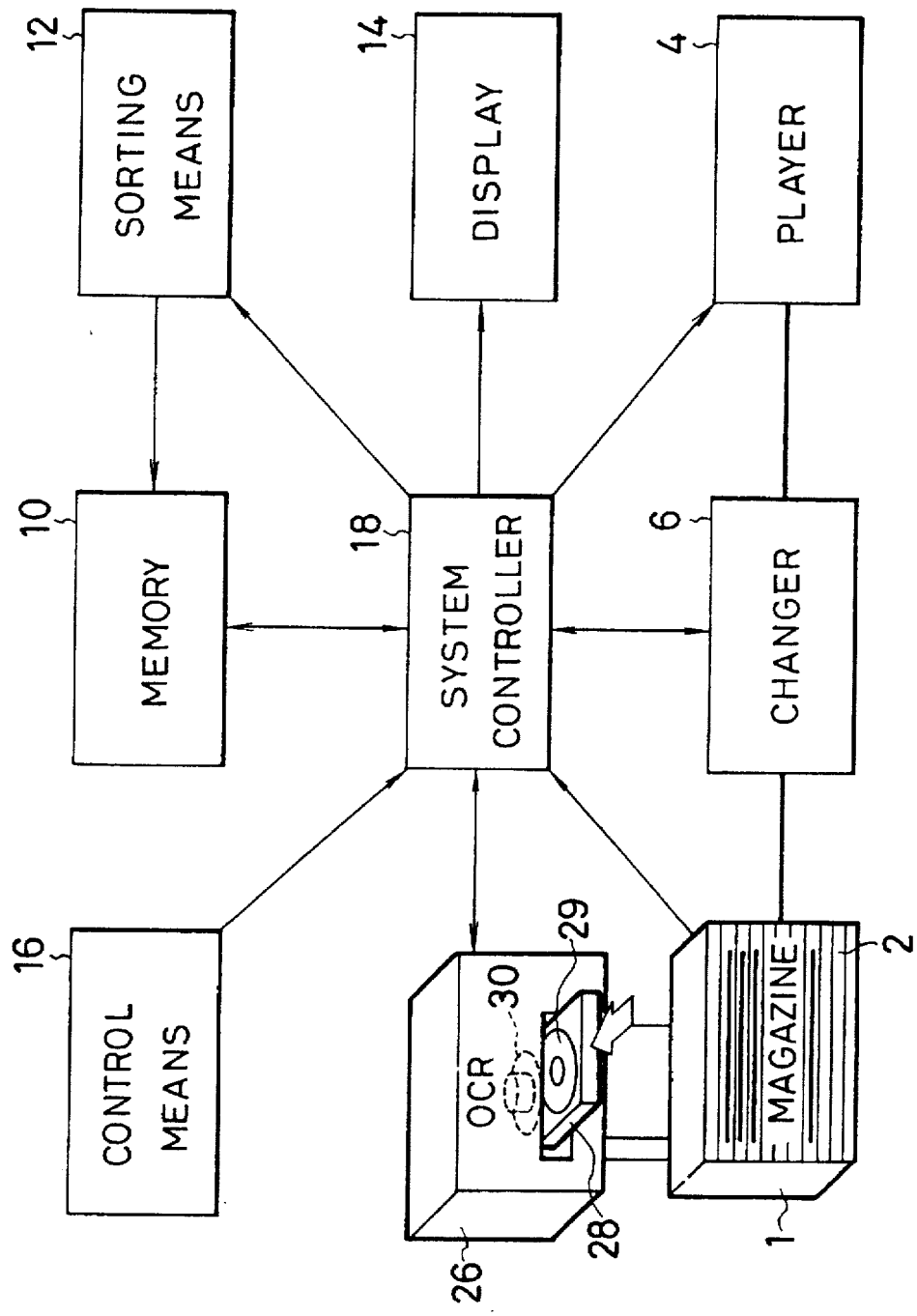
FIG. 5 illustrates an auto-changer for compact discs that uses optical character recognition to read title information from the discs.

FIG. 5 shows a similar auto-changer adapted for storing and playing compact disc media. Compact discs are a standard type of optical disc widely used for playing recorded music.

Scanning a compact disc for title information is more difficult than scanning a tape cassette, because the title is printed in different locations on different discs, and the disc may be placed in the apparatus in any rotational orientation. Accordingly, the OCR equipment 26 in FIG. 5 is somewhat more complex than the OCR equipment 22 in FIG. 4. The following description of the auto-changer in FIG. 5 will concentrate on the structure and operation of the OCR equipment 26, other aspects being substantially the same as in FIG. 4.

The OCR equipment 26 in FIG. 5 comprises a tray 28 mounted so that it is slidable in the direction of the arrow X. The function of the tray 28 is to receive a compact disc 29 and carry it into the OCR equipment 26. The OCR equipment 26 also comprises a turning means 30 which picks up the compact disc 29 and rotates it so that it can be scanned in various orientations. The scanning apparatus is not explicitly shown.

Figure 6A:
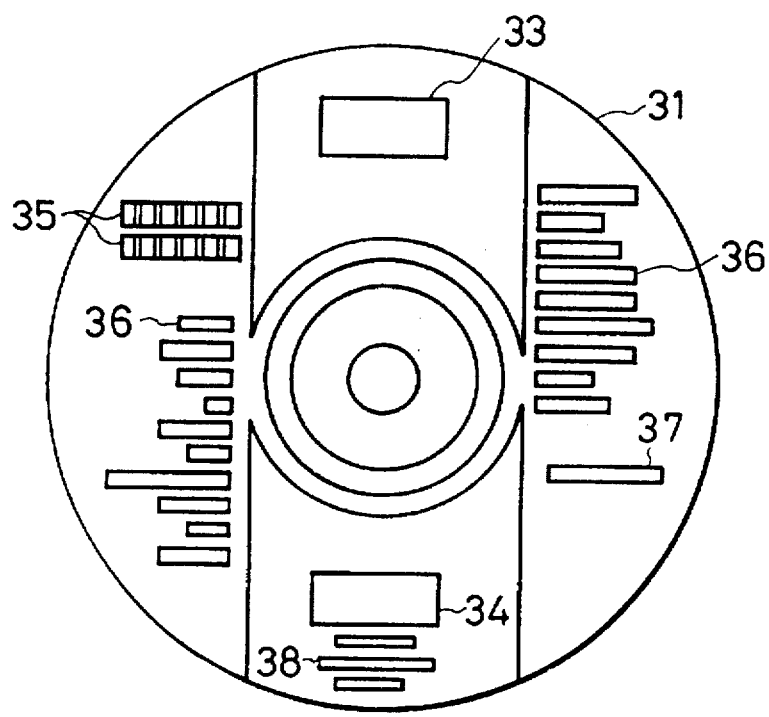
FIG. 6 illustrates information printed on a compact disc.
Figure 6B:
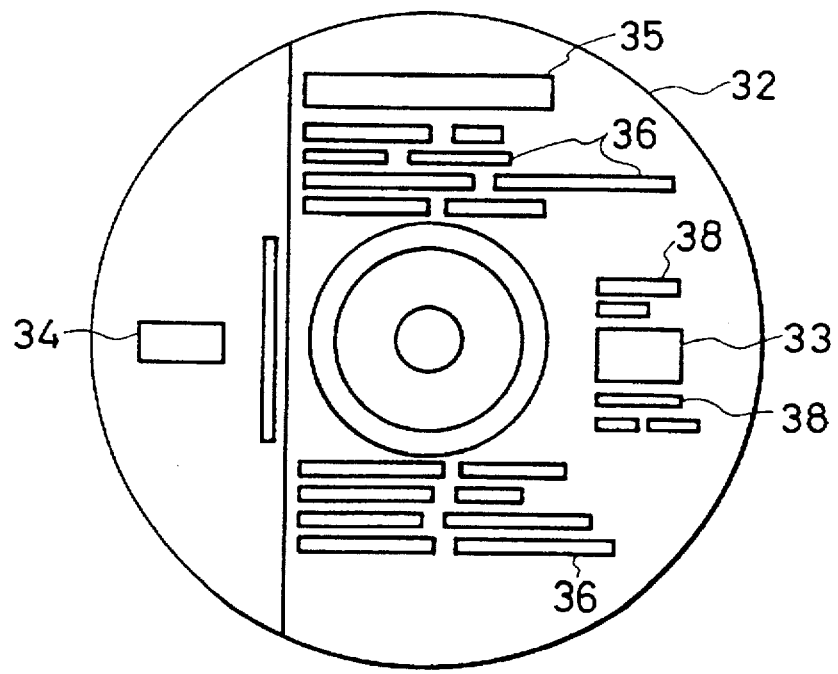

FIG. 6 shows examples of two common types of compact discs 31 and 32 which are identical in construction but differ in the disposition of information printed on their labels. The information printed on the first compact disc 31 comprises a CD logo mark 33, a manufacturer's logo mark 34, the disc title 35, track titles 36 identifying the music recorded on the disc, the performer's name 37, and further identifying information 38 such as a CD title number. The second compact disc 32 has the same information, except for the performer's name, printed in different locations.

Figure 7:
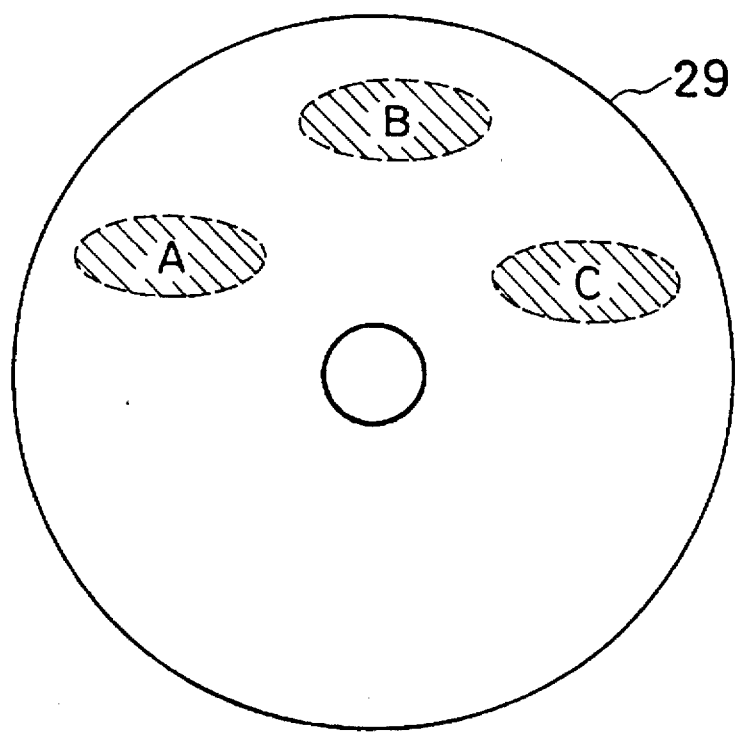
FIG. 7 shows possible locations of the title information in FIG. 6.

In general, the disc title 35 of a compact disc 29 is printed at one of the three locations marked A, B, and C in FIG. 7. The disc title 35 is moreover generally printed in larger characters than the track titles 36, performer's name 37, and identifying information 38. The only characters that might be larger than the characters in the disc title 35 appear in the CD logo mark 33 and the manufacturer's logo mark 34.

The CD logo mark includes the word "disc" printed in large, distinctive lower-case letters as shown in FIG. 8. Manufacturer's logo marks also tend to comprise distinctive patterns with large characters. The OCR equipment 26 has a memory in which template patterns for all these logo marks are stored.

Next the scanning a compact disc 29 and reading of its disc title 35 will be described with reference to the flowchart in FIG. 9.

Figure 9:
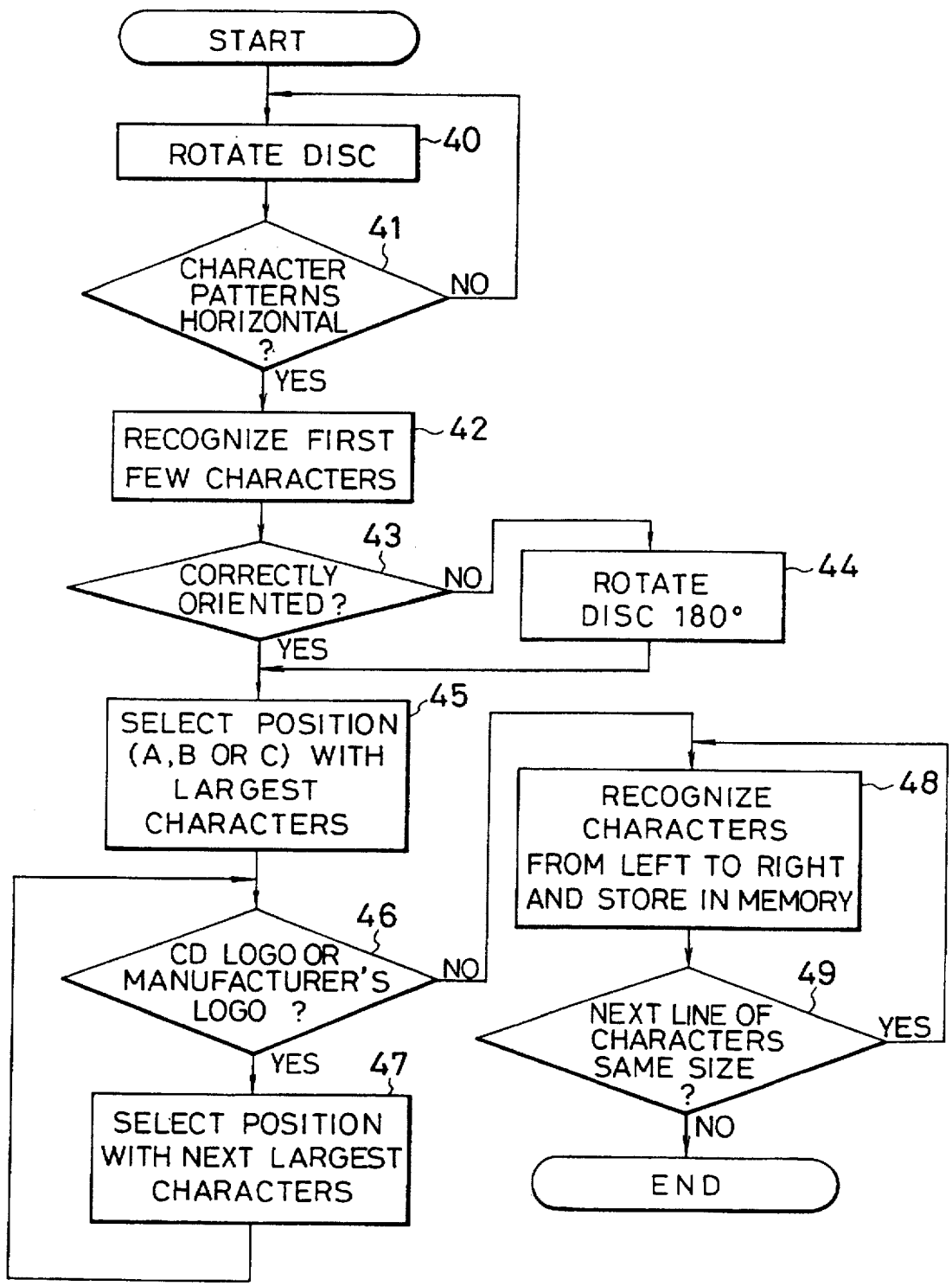
FIG. 9 is a flowchart illustrating steps in reading title information from a compact disc.

When the user places a compact disc 29 in the tray 28 and closes the tray 28, the turning means 30 in FIG. 5 picks up the compact disc 29 and begins rotating it at a certain angular rate (step 40 in FIG. 9). The OCR equipment 26 scans the character patterns printed on the compact disc 29 and determines when they are horizontally oriented (step 41). When the character patterns are horizontal, the turning means 30 stops rotating the compact disc 29.

Detection of horizontal orientation of the character patterns can be carried out by the following general procedure:
(1) An image of the disc surface is obtained.
(2) The image is broken down into connected components comprising lines or solid areas.
(3) The connected components are joined together to form regions.
(4) Features of the regions such as their surface area and length are measured. The horizontal orientation can be recognized, for example, as the orientation that produces regions with the maximum length.

This general procedure can be quickly carried out by the following specific method:
(1) The disc surface is scanned one-dimensionally to obtain a binary image.
(2) The binary image is statistically processed to distinguish characters from background. For example, white points may be recognized as belonging to the background and black points as belonging to characters.
(3) Runs of consecutive background points in the scanning direction having a run length less than a certain threshold value are changed to character points. Character points aligned in the scanning direction and spaced less than the threshold value apart are thus converted to a connected component. By varying the threshold value it is possible to join the connected components together to form a first set of regions comprising individual characters, lines of characters, or columns of characters.
(4) Steps (1) to (3) are repeated in the direction perpendicular to the scanning direction, producing a second set of regions, then the common parts of the first and second sets of regions are found. These common regions will be substantially rectangular in shape. By measuring the shapes of the rectangles it is possible to divide the image into different types of sub-images and recognize the direction in which lines of characters run.

When the compact disc 29 has been turned so that the character patterns are horizontal, the OCR equipment 26 attempts to recognize the first few characters in an arbitrary portion of the scanned image (step 42). A standard character pattern recognition technique such as template matching can be used. Next the OCR equipment 26 determines whether these first few character patterns are correctly oriented; that is, whether they are right-side up or upside down (step 43). If the character patterns are upside down, the disc is rotated through 180° to turn the characters right-side up (step 44).

Next the OCR equipment 26 scans the positions marked A, B, and C in FIG. 7 and selects the position with the largest characters (step 45). The size of the characters can be easily determined from the height of the connected components in the procedure outlined above. The OCR equipment 26 now compares the pattern in the selected position with the template patterns of the CD logo mark and manufacturer's logo marks stored in its memory (step 46). If the pattern in the selected position matches one of these logo marks, the OCR equipment 26 rejects the characters in this position, selects the position with the next largest characters instead (step 47), and repeats the previous step (step 46). In this way, the OCR equipment 26 quickly finds the position (A, B, or C) that has the largest characters that do not match a logo mark. This will be the position of the disc title.

The OCR equipment 26 now begins reading the disc title. In the selected position (A, B, or C), the line with the largest characters is regarded as the first title line, and its characters are recognized one by one from left to right, again using a technique such as template matching (step 48). The recognized characters are stored in a memory in the OCR equipment 26. When the end of this line is reached, the next line below is examined (step 49). If the characters in this line are the same size as the characters in the line just read, they are regarded as a continuation of the disc title, and the OCR equipment 26 performs the preceding step (step 48) again, adding the new line of characters to the title character string. Steps 48 and 49 are repeated until a line of smaller characters is encountered, indicating that the disc title has been completely read.

Having acquired the disc title in this way, the OCR equipment 26 sends the title character string to the system controller 18 in FIG. 5, and the transport means 24 carries the compact disc 29 to the magazine 1. Further operations are as already described in FIGS. 1 to 4.

The above procedure for reading the title from the compact disc 29 is given as only one example. Another possible method is to scan the disc two-dimensionally and process the scanned image electronically instead of rotating the disc, in which case the turning means 30 is not required.

In the preceding drawings the sorting process has been described as being performed by microelectronic components disposed in the sorting means 12, and the process of recognizing character patterns by microelectronic components disposed in the OCR equipment 22 or 26. It is also possible, however, for all these microelectronic components to be centralized in the system controller 18. In particular, the functions of sorting, character recognition, and control of the player 4 and changer 6 can all be executed by a single high-speed microprocessor provided with suitable software.

The system controller 18 is shown as connected individually to the other elements in the drawings, but alternative interconnection schemes are possible. For example, a bus scheme may be used in which some or all of the elements are interconnected by common bus lines. The control means 16 may be a remote control device which is not physically connected to the system controller 18, but coupled to it via a short-range radio or infrared link.

The media are not limited to audio and video discs and tape cassettes. For example, the magazine may store so-called CD-ROM discs containing computer programs, data, and text files. A procedure similar to that described in FIG. 9 for reading the title of a compact disc can be used to read the titles of such CD-ROM discs, or of other types of discs such as video discs.

Further modifications of a nature obvious to one skilled in the art can be in the preceding auto-changers without departing from the spirit and scope of the invention.

What is claimed is:
1. An auto-changer for storing a plurality of recorded media and for selecting and playing one of said media, comprising:
a magazine having a plurality of slots for storing said media;
a changer, mechanically coupled to said magazine and a player, for selecting a slot in said magazine and transferring a medium between said player and the selected slot;
a player for reproducing signals recorded on a medium transferred from a selected slot;
an input means for entering titles of each medium stored in said magazine, the input means including title distinguishing means,
for determining that each medium is correctly oriented so that a plurality of predetermined areas potentially containing title information can be optically scanned;

for optically scanning alphanumeric character information from each of the plurality of predetermined areas potentially containing title information printed on each medium, for comparing size of the scanned alphanumeric character information from each of the plurality of predetermined areas relative to the size of the scanned alphanumeric character information from each of the other predetermined areas, for distinguishing title information from other information printed on each medium based on the relative size comparison, and for subsequently recognizing the scanned alphanumeric character information of the predetermined area containing the distinguished title information, as the title of each medium;

a memory for storing a list of slot numbers with said entered titles of each medium stored in corresponding slots in said magazine;

a sorter for sorting said list in a predetermined manner, based upon said titles;

a display for visually displaying said sorted list of titles of each of the media stored in said magazine;

a control means for selecting one of said titles from said display for subsequent play; and a system controller, electrically coupled to said magazine, said player, said changer, said input means, said memory, said sorter, said display, and said control means, for receiving said titles from said input means, storing said titles and corresponding slot numbers in a list in said memory, commanding said sorter to sort said list in said predetermined manner, and commanding said changer to select a slot of said magazine corresponding to the title selected by said control means, and transfer a medium stored in the selected slot to said player for subsequent play.

2. The auto-changer of claim 1, wherein said sorter sorts said list by alphabetic order of said titles.

3. The auto-changer of claim 1, wherein said sorter divides said list into two parts including:

a first part comprising N titles of the N most recently entered media stored in said magazine, N being a fixed positive integer; and a second part comprising remaining titles of remaining media stored in said magazine.

4. The auto-changer of claim 1, wherein said input means further includes a keyboard.

5. The auto-changer of claim 1, further comprising transport means for transporting said media from said optical character recognition device to said magazine.

6. The auto-changer of claim 1, wherein said media are tape cassettes having title information printed in a predetermined position.

7. The auto-changer of claim 1, wherein said media are discs, and said optical character recognition device includes a turning means for rotating said media until said title information is horizontally oriented.

8. The auto-changer of claim 1, wherein the title distinguishing means of the input means rejects scanned alphanumeric character information comprising a logo mark as title information and recognizes other scanned alphanumeric character information as title information based upon relative size of the scanned alphanumeric character information.

9. An automatic storage and play device for storing a plurality of prerecorded media and for selecting and playing each of the media, comprising:

storing means for storing the plurality of media, one in each of a plurality of slots;

input means for inputting titles of each medium stored in said storing means, the input means including, a title distinguishing means, for determining that each medium is correctly oriented so that a plurality of predetermined areas potentially containing title information can be optically scanned;

for optically scanning alphanumeric character information from each of the plurality of predetermined areas potentially containing title information printed on each medium, for comparing size of the scanned alphanumeric character information from each of the plurality of predetermined areas relative to size of the scanned alphanumeric character information from each of the other predetermined areas, for distinguishing title information from other information printed on each medium based on the relative size comparison, and for subsequently recognizing the scanned alphanumeric character information of the predetermined area containing the distinguished title information, as the title of each medium;

memory for storing each of said input titles and a slot number corresponding to one of said plurality of slots in which each medium is stored;

display means for visually displaying each of said stored input titles to allow a user to select a stored medium for subsequent play based upon said visual display; and system controller, electrically coupled to each of the storage means, input means, display means and memory for commanding storage of input titles and slot numbers into the memory and controlling the display by the display means.

10. The apparatus of claim 9, further comprising:

sorting means, electrically coupled to the system controller, for arranging said stored input titles in a predetermined manner in response to a command from the system controller;

said display means displaying said input titles arranged in said predetermined manner, subsequent to operation of said sorting means and in response to a command from the system controller, to allow a user to expeditiously select a stored medium for subsequent play.

11. The apparatus of claim 10, wherein said predetermined manner includes arranging said stored input titles in alphabetic order.

12. The apparatus of claim 9, wherein said media include discs.

13. The apparatus of claim 9, wherein said media include cassettes.

14. The apparatus of claim 9, wherein said input means further includes a keyboard.

15. The apparatus of claim 9, wherein said title distinguish means includes an optical character recognition device for automatically scanning a medium and inputting a title for storage in said memory, upon the medium being stored in a slot of said storing means.

16. The apparatus of claim 9, wherein said slot number is transmitted, with the title, to the memory, from the input means.

17. The apparatus of claim 15, further comprising:

sorting means for continuously arranging said stored input titles in a predetermined manner upon storage of each title in said memory;

said display means continuously displaying said input titles arranged in the predetermined manner, to allow a user to expeditiously select a stored medium for subsequent play.

18. The apparatus of claim 17, wherein said predetermined manner includes arranging said stored input titles in alphabetic order.

19. The apparatus of claim 9, wherein said display means is physically separate from said storing means such that a user can select a stored medium for subsequent play without the need of viewing said medium in storing means.

20. The apparatus of claim 9, further comprising:
control means, electrically coupled to the system controller, for selecting one of the displayed titles;
a changer, mechanically coupled to the storing means and a player and electrically coupled to the system controller, for selecting the slot in the storing means corresponding to the selected title in response to a command from the system controller indicating selection of a title by the control means, and for transferring the medium in the selected slot to the player; and
the player for playing the transferred medium.

21. The apparatus of claim 20, wherein said media include discs.

22. The apparatus of claim 20, wherein said media include cassettes.

23. The apparatus of claim 20, wherein said input means further includes a keyboard.

24. The apparatus of claim 20, wherein said title distinguishing means includes an for automatically scanning a medium and inputting a title for storage in said memory, upon the medium being stored in a slot of said storing means.

25. The apparatus of claim 20, wherein said slot number is transmitted, with the title, to the memory, from the input means.

26. The apparatus of claim 20, further comprising:
sorting means, electrically coupled to the system controller, for continuously arranging said stored input titles in a predetermined manner upon storage of each title in said memory and upon command from the system controller;
said display means continuously displaying said input titles arranged in a predetermined manner, to allow a user to expeditiously select a stored medium for subsequent play.

27. The apparatus of claim 26, wherein said predetermined manner includes arranging said stored input titles in alphabetic order.

28. The apparatus of claim 20, wherein said display means is physically separate from said storing means such that a user can select a stored medium for subsequent play without the need of viewing said medium in storing means.

29. A method for storage and play of a plurality of prerecorded media comprising the steps of:
storing a plurality of media, one in each of a plurality of slots of a magazine;
inputting titles of each medium stored in the magazine, said inputting step including the substeps of,
determining that each medium is correctly oriented so that a plurality of predetermined areas potentially containing title information can be optically scanned;
optically scanning alphanumeric character information from each of the plurality of predetermined areas potentially containing title information printed on each medium, comparing size of the scanned alphanumeric character information from each of the plurality of predetermined areas relative to size of the scanned alphanumeric character information from each of the other predetermined areas,
distinguishing title information from other information printed on each medium based on the relative size comparison, and
subsequently recognizing the scanned alphanumeric character information of the predetermined area containing the distinguished title information, as the title of each medium;
storing, in a memory, each of the titles and a slot number corresponding to one of the plurality of slots in which each medium is stored; and
displaying, visually, each of the stored input titles to allow a user to select a medium for subsequent play based upon the visual display.

30. The method of claim 29, further comprising the steps of:
arranging the stored input titles, prior to display, in a predetermined manner, wherein the arranged stored input titles are subsequently displayed in the display step to allow a user to expeditiously select a stored medium for subsequent play.

31. The method of claim 30, wherein the predetermined manner of arranging includes arranging the stored titles in alphabetic order.

32. The method of claim 29, further comprising the steps of:
selecting one of the displayed titles;
controlling a changer, mechanically coupled to the magazine and a player, to select the slot corresponding to the selected title, and to transfer the medium from the selected slot to the player; and
playing the transferred medium in the player.

33. The method of claim 32, wherein the display is physically separated and electrically operatively connected to the player, changer, and magazine such that a user can select a stored medium for subsequent play without the need of viewing the medium in the magazine.

34. The auto-changer of claim 1, wherein said title information is human readable character information.

35. The auto-changer of claim 6, wherein said title information is human readable character information.

36. The apparatus of claim 9, wherein said title information is human readable character information.

37. The method of claim 29, wherein said title information is human readable character information.

38. The auto-changer of claim 1, wherein the title distinguishing means of the input means selects the one of the plurality of the predetermined areas containing scanned alphanumeric character information which is relatively largest in size as containing title information, to distinguish title information from other information printed on each medium.

39. The auto-changer of claim 38, wherein the title distinguishing means of the input means rejects the selected one of the plurality of predetermined areas, containing scanned alphanumeric character information relatively largest in size, as containing title information, upon a subsequent determination that the scanned alphanumeric character information in the selected one area is a logo mark.

40. The auto-changer of claim 39, wherein the title distinguishing means of the input means then selects a next one of the plurality of predetermined areas containing scanned alphanumeric character information next relatively largest in size as containing title information, when distinguishing title information from other information printed on each medium, upon rejecting the selected one of the plurality of predetermined areas containing scanned alphanumeric character information relatively largest in size.

41. The automatic storage and play device of claim 9, wherein the title distinguishing means of the input means selects the one of the plurality of the predetermined areas containing scanned alphanumeric character information relatively largest in size as containing title information, when distinguishing title information from other information printed on each medium.

42. The automatic storage and play device of claim 41, wherein the title distinguishing means of the input means rejects the selected one of the plurality of predetermined areas, containing scanned alphanumeric character information relatively largest in size, as containing title information, upon a subsequent determination that the scanned alphanumeric character information in the selected one area is a logo mark.

43. The automatic storage and play device of claim 42, wherein the title distinguishing means of the input means then selects a next one of the plurality of predetermined areas containing scanned alphanumeric character information next relatively largest in size as containing title information, when distinguishing title information from other information printed on each medium, upon rejecting the selected one of the plurality of predetermined areas containing scanned alphanumeric character information relatively largest in size.

44. The method of claim 29, wherein the inputting step further includes selecting the one of the plurality of the predetermined areas containing scanned alphanumeric character information relatively largest in size as containing title information, to distinguish title information from other information printed on each medium.

45. The method of claim 44, wherein the inputting step further includes rejecting the selected one of the plurality of predetermined areas containing scanned alphanumeric character information relatively largest in size, as containing title information, upon a subsequent determination that the scanned alphanumeric character information in the selected one area is a logo mark.

46. The method of claim 45, wherein the inputting step further includes selecting a next one of the plurality of predetermined areas containing scanned alphanumeric character information next relatively largest in size as containing title information, when distinguishing title information from other information printed on each medium, upon rejecting the selected one of the plurality of predetermined areas containing scanned alphanumeric character information relatively largest in size.

* * * * *